US009600395B2

United States Patent
Salecker et al.

(10) Patent No.: US 9,600,395 B2
(45) Date of Patent: Mar. 21, 2017

(54) SOFTWARE QUALITY EVALUATING SYSTEM AND METHODS FOR DETERMINING AN EXTENT OF SOFTWARE CODE CHANGES

(75) Inventors: Jürgen Salecker, München (DE); Egon Wuchner, Biessenhofen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1147 days.

(21) Appl. No.: 13/313,404

(22) Filed: Dec. 7, 2011

(65) Prior Publication Data

US 2013/0152044 A1      Jun. 13, 2013

(51) Int. Cl.
G06F 9/44    (2006.01)
G06F 11/36   (2006.01)

(52) U.S. Cl.
CPC ............ G06F 11/3616 (2013.01); G06F 8/70 (2013.01); G06F 8/77 (2013.01)

(58) Field of Classification Search
CPC ........... G06F 8/70; G06F 8/77; G06F 11/3616
USPC ....................................................... 717/120
See application file for complete search history.

(56) References Cited

U.S. PATENT DOCUMENTS

| 7,428,726 | B1 * | 9/2008 | Cowan et al. | 717/122 |
| 2004/0117761 | A1 * | 6/2004 | Andrews et al. | 717/101 |
| 2008/0271006 | A1 * | 10/2008 | Nagappan et al. | 717/162 |
| 2009/0012969 | A1 * | 1/2009 | Rail et al. | 707/100 |
| 2012/0060144 | A1 * | 3/2012 | Novak | G06Q 10/06 717/105 |
| 2012/0297364 | A1 * | 11/2012 | Wehrwein | G06F 8/75 717/123 |
| 2012/0317541 | A1 * | 12/2012 | Kaulgud | G06F 8/77 717/102 |

OTHER PUBLICATIONS

Alderete et al. "Using Software Maintainability Models to Track Code Health", 1994, Proceedings on the International Conference on Software Maintenance, pp. 154-160.*

(Continued)

*Primary Examiner* — John Chavis
(74) *Attorney, Agent, or Firm* — Slayden Grubert Beard PLLC

(57) ABSTRACT

A method for determining an extent of code changes upon implementation of a software modification has the steps of: registering the number of software code components and the respective number of lines of code of each software component of a software code before the implementation of the software modification, implementing the software modification by changing the software code, determining the number of software code components that have changed due to the implementation of the software modification, determining the number of lines of code of each software component that have changed due to the implementation of the software modification, and determining an invasiveness value on the basis of the determined number of software code components that have changed and determined number of lines of code that have changed, the invasiveness value being indicative of the extent of software code changes upon implementation of the software modification.

19 Claims, 2 Drawing Sheets

(56) References Cited

OTHER PUBLICATIONS

Hall et al. "Software evolution: code delta and code churn", 2000, Journal of Systems and Software 54, pp. 111-118.*
Nikora et al. "Understanding the Nature of Software Evolution", 2003, Proceedings of the International Conference on Software Maintenance (ICSM'03).*
German et al. "Measuring fine-grained change in software: towards modification-aware change metrics", 2005, 11th IEEE International Software Metrics.Symposium.*
Vasilescu et al. "Comparative Study of Software Metrics' Aggregation Techniques", Dec. 2010, retrieved from http://repository.tue.nl/694355.*
Nagappan et al. "Use of Relative Code Churn Measures to Predict System Defect Density", 2005, ICSE'05.*
Bhat et al. "Tempest: Towards Early Identification of Failure-prone Binaries", Jun. 2008, International Conference on Dependable Systems & Networks.*

* cited by examiner

SOFTWARE QUALITY EVALUATING SYSTEM AND METHODS FOR DETERMINING AN EXTENT OF SOFTWARE CODE CHANGES

TECHNICAL FIELD

The present invention relates to a software quality evaluating system and methods for determining an extent of software code changes.

BACKGROUND

Products and systems that rely on software code need to undergo maintenance every so often. Maintenance may involve adding new features to the software, adapting the software requirements or fixing errors in the software. Such maintenance may be very cost intensive.

The maintenance state of a product or system involving software code may be expressed in terms of "costs of changes", i.e. how much effort will have to be spent on the implementation of new features or removing of defects in the software code. In order to judge the maintenance state and, in turn, the quality of the software code, a measure for maintainability of a product or system with respect to its software is generally desirable.

SUMMARY

In one aspect, according to various embodiments, a method for determining an extent of code changes upon implementation of a software modification, may comprising registering the number of software code components and the respective number of lines of code of each software component of a software code before the implementation of the software modification, implementing the software modification by changing the software code, determining the number of software code components that have changed due to the implementation of the software modification, determining the number of lines of code of each software component that have changed due to the implementation of the software modification, and determining an invasiveness value on the basis of the determined number of software code components that have changed and determined number of lines of code that have changed, the invasiveness value being indicative of the extent of software code changes upon implementation of the software modification.

According to one embodiment determining the invasiveness value is performed on the basis of the ratio of the determined number of software code components that have changed to the registered number of software code components before the implementation of the software modification.

According to another embodiment determining the invasiveness value is performed on the basis of the ratio of the determined number of lines of code that have changed to the registered number of lines of code before the implementation of the software modification.

According to another embodiment, the method further comprises registering the number of methods for each software component before the implementation of the software modification, determining the number of methods for each software component that have changed due to the implementation of the software modification, and determining the invasiveness value on the basis of the ratio of the determined number of methods for each software component that have changed and the registered number of methods for each software component before the implementation of the software modification.

According to another embodiment, the method further comprises registering the number of members of each instantiable software construct of the software code before the implementation of the software modification, determining the number of members of each instantiable software construct that have changed due to the implementation of the software modification, and determining the invasiveness value on the basis of the ratio of the determined number of members of each instantiable software construct that have changed and the registered number of members of each instantiable software construct before the implementation of the software modification.

In another aspect, according to various embodiments, a method for determining an extent of code changes upon fixing a software bug in a bugged software code, may comprise registering the number of software code components and the respective number of lines of code of each software component of the bugged software code, fixing the software bug by changing the software code, determining the number of software code components that have changed due to the software bug fix, determining the number of lines of code of each software component that have changed due to the software bug fix, and determining a locality value on the basis of the determined number of software code components that have changed and determined number of lines of code that have changed, the locality value being indicative of the extent of software code changes that have been caused by the software bug fix.

According to one embodiment, determining the locality value is performed on the basis of the ratio of the determined number of software code components that have changed to the registered number of software code components before the software bug fix.

According to another embodiment, determining the locality value is performed on the basis of the ratio of the determined number of lines of code that have changed to the registered number of lines of code before software bug fix.

According to another embodiment, the method further comprises registering the number of methods for each software component before the software bug fix, determining the number of methods for each software component that have changed due to the software bug fix, and determining the locality value on the basis of the ratio of the determined number of methods for each software component that have changed and the registered number of methods for each software component before the software bug fix.

According to another embodiment, the method further comprises registering the number of members of each instantiable software construct of the software code before the software bug fix, determining the number of members of each instantiable software construct that have changed due to the software bug fix, and determining the locality value on the basis of the ratio of the determined number of members of each instantiable software construct that have changed and the registered number of members of each instantiable software construct before the software bug fix.

In yet another aspect, according to various embodiments, a software quality evaluating system may comprise a processor which is configured to track the number of software code components and the respective number of lines of code of each software component of a software code under modification, compare the number of software code components that have changed due to a modification of the software to the overall number of software code components, compare the number of lines of code of each software code component that have changed due to the modification of the software to the overall number of lines of code of each software code component, determine an invasiveness value on the basis of the result of the comparisons of the comparing device, the invasiveness value being indicative of the extent of software code changes upon modification of the software, and to output the invasiveness value for each software modification.

According to one embodiment, the software modification is one of the group of a software bug fix, an implementation of a software feature, a functional software requirement and a non-functional software requirement.

According to another embodiment, the processor is configured to output a series of invasiveness values for a series of subsequent software modifications.

In yet another aspect, according to various embodiments, a computer program product can be embodied on a computer-readable medium, the computer program product comprising instructions executable by a machine or a processor, the instructions implementing a method for determining an extent of code changes upon implementation of a software modification, the method comprising registering the number of software code components and the respective number of lines of code of each software component of a software code before the implementation of the software modification, implementing the software modification by changing the software code, determining the number of software code components that have changed due to the implementation of the software modification, determining the number of lines of code of each software component that have changed due to the implementation of the software modification, and determining an invasiveness value on the basis of the determined number of software code components that have changed and determined number of lines of code that have changed, the invasiveness value being indicative of the extent of software code changes upon implementation of the software modification.

In yet another aspect, according to various embodiments, a computer program product can be embodied on a computer-readable medium, the computer program product comprising instructions executable by a machine or a processor, the instructions implementing a method for determining an extent of code changes upon fixing a software bug in a bugged software code, the method comprising registering the number of software code components and the respective number of lines of code of each software component of the bugged software code, fixing the software bug by changing the software code, determining the number of software code components that have changed due to the software bug fix, determining the number of lines of code of each software component that have changed due to the software bug fix, and determining a locality value on the basis of the determined number of software code components that have changed and determined number of lines of code that have changed, the locality value being indicative of the extent of software code changes that have been caused by the software bug fix.

BRIEF DESCRIPTION OF THE DRAWINGS

The accompanying drawings are included to provide a further understanding of the various embodiments and are incorporated in and constitute a part of this specification. The drawings illustrate the embodiments and together with the description serve to explain various principles. Other embodiments and many of the intended advantages will be readily appreciated as they become better understood by reference to the following detailed description. The elements of the drawings are not necessarily to scale relative to each other. Like reference numerals designate corresponding similar parts.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Software code within the meaning of this application relates to any kind of computer-readable programming language, for example C, C++, D, Java, JavaScript, Pascal, SQL, Perl or any other similar programming language.

Software code components within the meaning of this application relate to software artefacts or software fragments, that are separate software code objects produced as tangible by-products during the development of software code. Software code components may include classes, methods, functions, libraries or other design constructs of the software architecture.

Software code bugs within the meaning of this application relate to errors, flaws, mistakes, failures, or faults in a software code, that when compiled and executed on a computer or system causes the computer or system to produce incorrect, unexpected and/or undesired results, or causes those to behave in unintended ways.

The proposed methods and systems aim at measuring the costs and risks of the implementation of software modifications or the removal of software bugs. When implementing a software modification, existent software code components, for example source code, configuration files, libraries, methods and the like, may be changed or deleted and new software code components may be added to the software project. Generally speaking, a new feature and its implementation should affect the existent software code to a reasonable extent only, that is, the impact of the implementation should be within certain limits for time and cost expenditure when implementing the software modification.

A software modification or the removal of software bugs should mainly involve the creation of new software code components while leaving the existent software code base mainly intact. On the other hand, software modifications that require major modifications of existent software code components indicate the need for major refactoring or even redesign activities.

Figure 1:
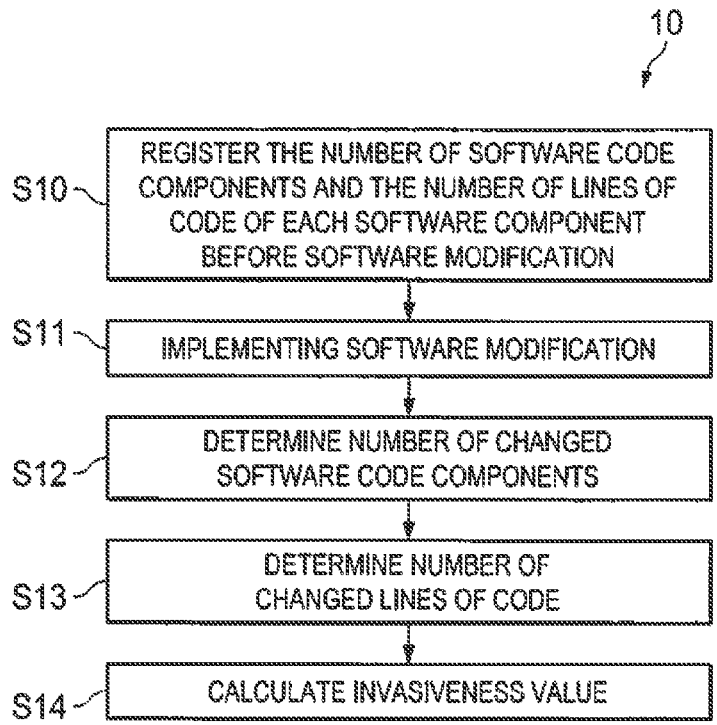
FIG. 1 schematically illustrates an embodiment of a method for determining an extent of code changes upon implementation of a software modification.

FIG. 1 schematically illustrates a method 10 for determining an extent of code changes upon implementation of a software modification. In a first step S10, the method 10 comprises registering the number of software code components and the respective number of lines of code of each software component of a software code before the implementation of the software modification. The number of lines of code may have a value L(A,F), wherein A is the respective software code component and F is the software modification to implement.

In a second step S11, the method 10 comprises implementing the software modification F by changing the software code. The software modification may include changing the lines of code as necessary and as determined by the desired effect of the software modification F. In a third step S12, the method 10 may comprise determining the number C(F) of software code components that have changed due to the implementation of the software modification F. In a fourth step S13 of the method 10, the number of lines of code LC(A,F) of each software component A that have changed due to the implementation of the software modification F may be determined.

In a fifth step S14, the method 10 may comprise determining an invasiveness value I(F) for the respective software modification F on the basis of the determined number C(F) of software code components that have changed and determined number of lines of code LC(A,F) that have changed, the invasiveness value I(F) being indicative of the extent of software code changes upon implementation of the software modification.

The changed lines of code LC(A,F) for each software code component A may be put in relation to the overall lines of code L(A,F) for this software code component, in order to evaluate the impact the software modification F had on this software code component A in terms of maintenance costs. The less the number of lines of code that needed to be changed, the less the associated maintenance costs. It may therefore be possible to determine the ratio between the number of the changed lines of code LC(A,F) and the overall number of lines of code L(A,F) for each software code component A.

Each software code component that had to be changed increases the maintenance costs as well. On the other hand, deleted or newly added software code components reduce the impact a software modification F will have on a software code. Therefore, when determining the invasiveness value I(F), the number N(F) of newly added software code components and/or the number D(F) of deleted software code components may be taken into account as well.

One possibility to calculate an invasiveness value I(F) is exemplarily given in equation (1).

$$I(F)=C(F)*(N(F))^{-1}*(D(F))^{-1}*\Sigma_A(LC(A,F)*L(A,F)^{-1}) \quad (1)$$

Additionally, when determining the invasiveness value I(F) fo a software modification F, design constructs like class methods, class members, functions, libraries or other architectural constituents may be taken into account. For example, it may be possible to determine the overall number M(F) of methods in the software code and the number MC(F) of methods that are changed upon implementation of the software modification F. In a similar way, the overall number CM(Cl,F) of class members of class Cl and the number CMC(Cl,F) of class members of class Cl that have been changed upon implementation of the software modification F may be determined. Optionally, for special design constructs DC like functions in C the overall number L(DC,F) of lines of code per design construct DC and the changed number LC(DC,F) of lines of code upon implementation of the software modification F may be determined.

With this information the invasiveness of the software modification F may be evaluated with a finer granularity. For example, the spread S(F) of the software modification F may be determined according to equation (2):

$$S(F)=(MC(F)+CMC(F))*(NDC(F)+DDC(F))^{-1} \quad (2),$$

wherein NDC(F) is the number of newly added design constructs DC and DDC(F) is the number of deleted design constructs DC upon implementation of the software modification F.

The invasiveness I(F) may then be exemplarily determined by using equation (3):

$$I(F)=S(F)*\Sigma_M(LC(M,F)*L(M,F)^{-1})*\Sigma_{cl}(CMC(Cl,F)*CM(Cl,F)^{-1}) \quad (3).$$

Irrespective of what basis the invasiveness value I(F) may be determined, the lower the invasiveness value I(F), the less impact the respective software modification F has on the existing software code. Thus, with the invasiveness value I(F) as an indicator, it may be possible to evaluate the maintenance efforts and maintenance costs involved with implementing the software modification F. Decision about actions to be taken for certain features may become more reliable when taking the invasiveness value I(F) into account. The higher the invasiveness value I(F), the higher the effort to comprehend the changes and maintain the software code, and the higher the need for more verification and validation of design, architecture and code itself.

The development or maintenance costs of features allow for deciding on the appropriate set of features of a release. The more expensive features a release includes, the higher the rate of defects to expect afterwards. A constantly high rate of expensive features may call for refactoring or redesigning the whole software code, in order to save maintenance costs in the long run.

With the method 10, a metric database over the complete life cycle of a software product, that is the development as well as the maintenance phase, may be established. The method 10 allows for monitoring the maintenance effort for the software product over time, recognizing trends and estimating maintenance costs in terms of maintenance time and money needed.

Figure 2:
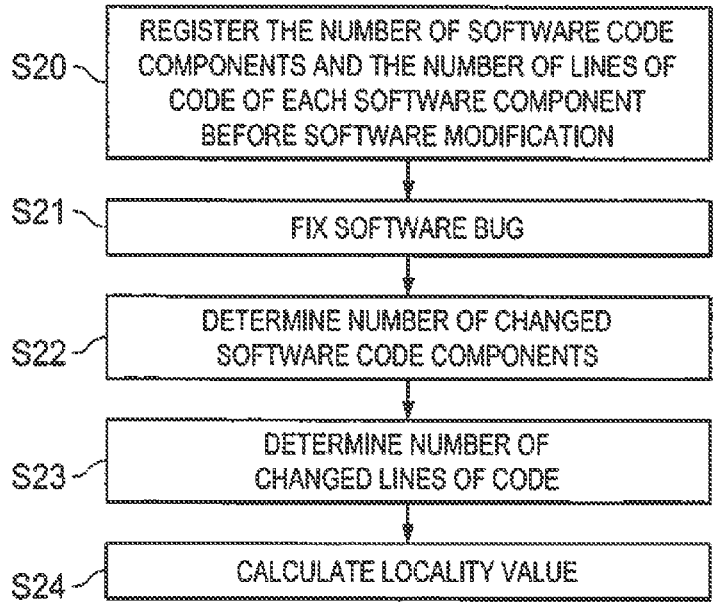
FIG. 2 schematically illustrates an embodiment of a method for determining an extent of code changes upon fixing a software bug in a bugged software code.

FIG. 2 schematically illustrates an embodiment of a method 20 for determining an extent of code changes upon fixing a software bug in a bugged software code. The same mechanisms and principles that have been detailed above with respect to software modifications can be applied to software bug fixes as well. For bug fixes, a locality value may be determined, i.e. a value that is indicative of the locality of changes due to a software bug fix. Changes in the software code due to a software bug fix should remain restricted to a small set of software code components and the associated design constructs. On the contrary, new and deleted software code components could be an indicator of major changes that still change the software code only locally. The higher the locality value of a software bug fix, the better the maintenance state of this particular software bug fix and the software product.

In a first step S20, the method 20 comprises registering the number of software code components and the respective number of lines of code of each software component of the bugged software code. In a second step S21, the method 20 comprises fixing the software bug by changing the software code. In a third step S22, the method 20 comprises determining the number of software code components that have changed due to the software bug fix. In a fourth step S23, the method 20 comprises determining the number of lines of code of each software component that have changed due to the software bug fix. Finally, in a fifth step S24, the method 20 comprises determining a locality value on the basis of the determined number of software code components that have changed and determined number of lines of code that have changed, the locality value being indicative of the extent of software code changes that have been caused by the software bug fix.

Figure 3:
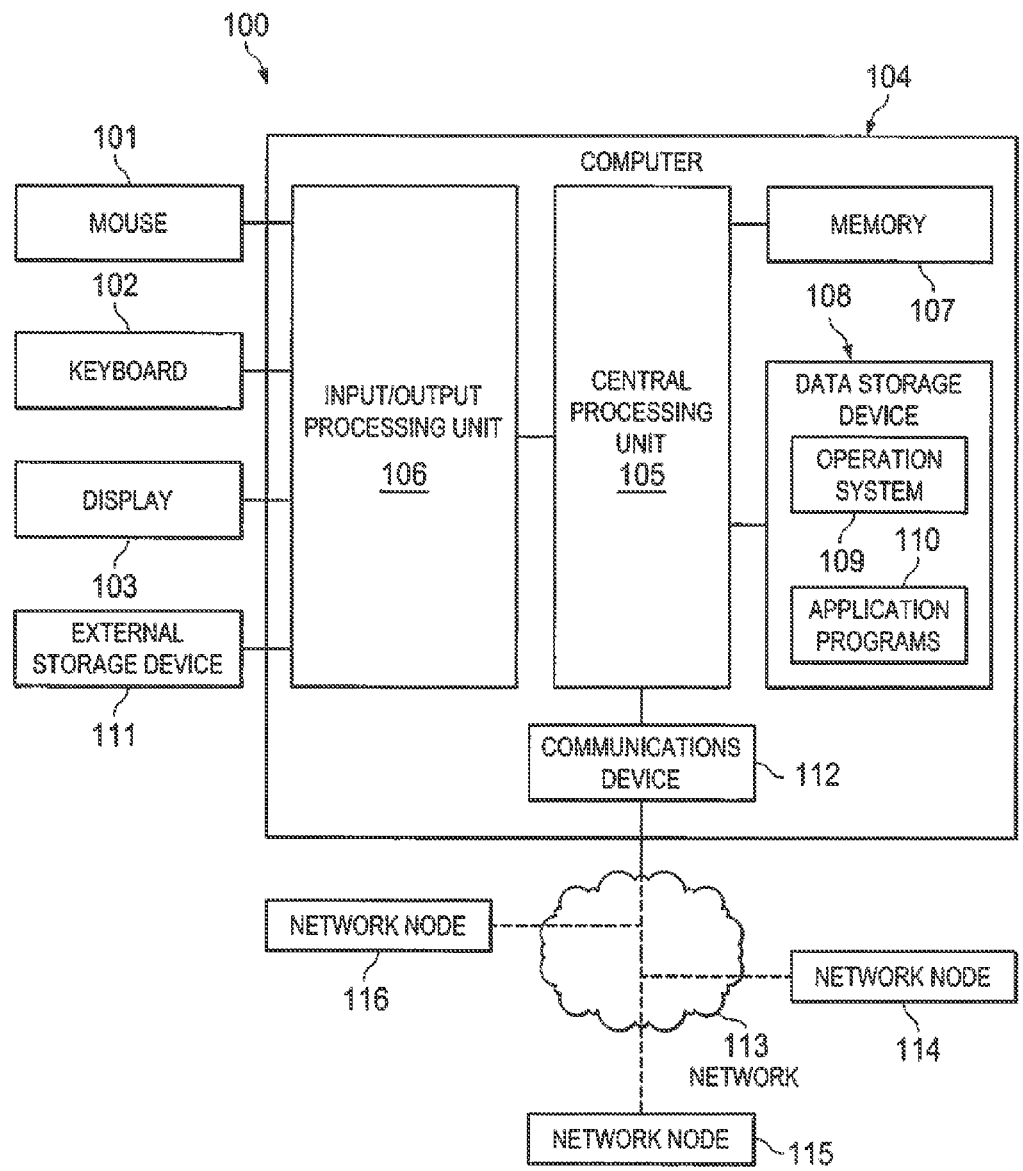
FIG. 3 schematically illustrates an embodiment of a software quality evaluating system.

FIG. 3 schematically illustrates an embodiment of a software quality evaluating system 100. The system 100 may be programmable for determining an extent of code changes upon fixing a software bug in a bugged software code or upon implementation of a software modification. The system 100 may include a plurality of input/output devices, for example a mouse 101, a keyboard 102 or a display device 103 such as a monitor, or other not depicted input devices like a microphone, a joystick, a game pad, a scanner, or the like.

The system 100 may further include a computer 104, for example a personal computer, a workstation, a server or a similar device, having a central processor unit (CPU) 105, an input/output processing unit 106, a memory 107 and a data storage device 108. The data storage device 108 may be configured to store instructions executable by a computer or machine, data, machine-readable code and/or a plurality of programs such as an operating system 109 and a plurality of application programs 110 for implementing a method for determining an extent of code changes upon fixing a software bug in a bugged software code or upon implementation of a software modification.

In particular, the application programs 110 may be configured to implement one or more of the methods 10 and 20 as depicted and detailed with respect to FIGS. 1 and 2. The application programs may be processed by the CPU 105. There may be only one or there may be more than one CPUs 105, such that the processor of the computer 104 comprises a single central processing unit, or a plurality of processing units, commonly referred to as a multiprocessor or parallel-processor environment. In various embodiments, which may comprise some but not all of the foregoing embodiments, the computer 104 may be a conventional computer, a distributed computer, or any other type of computer. The computer 104 may be a handheld device, a workstation, a server, a smartphone, a laptop or some combination of these capable of responding to and executing instructions in a defined manner.

The operating system 109 may for example be a Windows operating system, a Unix operating system, a Linux operating system, a Macintosh operating system, a Chrome operating system or similar operating systems. The data storage device 108 may be any form of non-volatile memory, including by way of example semiconductor memory devices, such as Erasable Programmable Read-Only Memory (EPROM), Electrically Erasable Programmable Read-Only Memory (EEPROM), and flash memory devices, magnetic disks such as internal hard disks and removable disks, magneto-optical disks, Digital Versatile Disc Memory (DVD) and Compact Disc Read-Only Memory (CD-ROM).

It may also be possible that the application programs 110 are stored on an external storage device 111 which may be connected to the computer 104 via the input/output processing unit 106.

The system 100 may further comprise a communications device 112, for example a modem or a network adapter for exchanging data with a network 113. The network 113 may for example be the Internet, a local area network (LAN), a wide area network (WAN), analog or digital wired or wireless telephone networks, radio, television, cable, or satellite networks. The system 100 may communicate with a plurality of other network nodes 114, 115, 116 over the network 113.

A user may enter commands and information into computer 104 through the plurality of input/output devices 101, 102, 103, which commands and information may be processed by the input/output processing unit 106 and relayed to the CPU 105 for further processing. The CPU 105 may in turn relay processed data via the input/output processing unit 106 one or more of the input/output devices, for example the display 103 for displaying the processed data to the user.

In the foregoing detailed description, various features are grouped together in one or more examples or examples for the purpose of streamlining the disclosure. This method of disclosure is not to be interpreted as reflecting an intention that the claimed examples require more features than are expressly recited in each claim. Rather, as the following claims reflect, subject matter according to various embodiments lies in less than all features of a single disclosed example. Thus the following claims are hereby incorporated into the detailed description as examples of the various embodiments, with each claim standing on its own as a separate example. It is understood that the above description is intended to be illustrative, and not restrictive. It is intended to cover all alternatives, modifications and equivalents as may be included within the scope of the invention as defined in the appended claims. Many other examples will be apparent to one skilled in the art upon reviewing the above specification. The scope of the invention should, therefore, be determined with reference to the appended claims, along with the full scope of equivalents to which such claims are entitled. Specific nomenclature used in the foregoing specification is used to provide a thorough understanding of various embodiments. However, it will be apparent to one skilled in the art in light of the specification provided herein that the specific details are not required in order to practice the invention. Thus, the foregoing descriptions of specific embodiments are presented for purposes of illustration and description. They are not intended to be exhaustive or to limit the invention to the precise forms disclosed, obviously many modifications and variations are possible in view of the above teachings. The embodiments were chosen and described in order to best explain the various principles and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS

10 Method
20 Method
100 System
101 Mouse
102 Keyboard
103 Display
104 Computer
105 Central Processing Unit
106 Input/output Processing Unit
107 Memory
108 Data Storage Device
109 Operation System
110 Application Programs 111 External Storage Device
112 Communications Device
113 Network
114 Network Node
115 Network Node
116 Network Node
S10 Method Step
S10 Method Step
S11 Method Step
S12 Method Step
S13 Method Step
S14 Method Step
S20 Method Step
S21 Method Step
S22 Method Step
S23 Method Step
S24 Method Step

What is claimed is:

1. A method for determining an extent of code changes upon implementation of a software modification to a software product, comprising:
providing an application program to a computer for installation in a non-transitory, computer readable media of the computer;
providing the software product to the computer for installation in a non-transitory, computer readable media of the computer;
executing, by a processor of the computer, the application program to:
register a number of software code components and a respective number of lines of code of each software component of the software product before the implementation of the software modification;
implement the software modification by changing the software product;
determine a number of software code components that have changed due to the implementation of the software modification;
determine a number of software code components that have been added due to the implementation of the software modification;
determine a number of software code components that have been deleted due to the implementation of the software modification;
determine a locality value by calculating a ratio of the number of software code components that have been changed to the number of software code components that have been added and deleted;
determine a number of lines of code of each software component that have changed due to the implementation of the software modification;
determine an invasiveness value based at least on (a) the determined locality value and (b) the determined number of lines of code that have changed, the invasiveness value being indicative of the extent of software code changes upon implementation of the software modification; and
activating the application program to display the invasiveness value on the computer and to output the invasiveness value to a metric database, whereby costs of development and maintenance for the modified software product may be determined.

2. The method according to claim 1, wherein determining the invasiveness value is performed on the basis of the ratio of the determined number of lines of code that have changed to the registered number of lines of code before the implementation of the software modification.

3. The method according to claim 1, wherein the application program is further executable by the processor to:
register a number of methods for each software component before the implementation of the software modification;
determine a number of methods for each software component that have changed due to the implementation of the software modification; and
determine the invasiveness value on the basis of the ratio of the determined number of methods for each software component that have changed and the registered number of methods for each software component before the implementation of the software modification.

4. The method according to claim 1, further comprising:
register a number of members of each instantiable software construct of the software code before the implementation of the software modification;
determine a number of members of each instantiable software construct that have changed due to the implementation of the software modification; and
determine the invasiveness value on the basis of the ratio of the determined number of members of each instantiable software construct that have changed and the registered number of members of each instantiable software construct before the implementation of the software modification.

5. A method for determining an extent of code changes upon fixing a software bug in a bugged software code of a software product, comprising:
providing an application program to a computer for installation in a non-transitory, computer readable media of the computer;
providing the software product to the computer for installation in a non-transitory, computer readable media of the computer;
executing, by a processor of the computer, the application program to:
register a number of software code components and a respective number of lines of code of each software component of the bugged software code;
fixing the software bug by changing the software code;
determine a number of software code components that have changed due to the software bug fix;
determine a number of software code components that have been added due to the software bug fix;
determine a number of software code components that have been deleted due to the software bug fix;
determine a locality value by calculating a ratio of the determined number of software code components that have changed and determined number of software code components that have been added and deleted, the locality value being indicative of the extent of software code changes that have been caused by the software bug fix; and
activating the application program to display the invasiveness value on the computer and to output the invasiveness value to a metric database, whereby costs of development and maintenance for the modified software product may be determined.

6. The method according to claim 5, wherein the application program is further executable by the processor to determine a number of lines of code of each software component that have changed due to the software bug fix; and
wherein determining the locality value is performed on the basis of the ratio of the determined number of lines of code that have changed to the registered number of lines of code before software bug fix.

7. The method according to claim 5, wherein the application program is further executable by the processor to:
register a number of methods for each software component before the software bug fix;
determine a number of methods for each software component that have changed due to the software bug fix; and
determine the locality value on the basis of the ratio of the determined number of methods for each software component that have changed and the registered number of methods for each software component before the software bug fix.

8. The method according to claim 5, wherein the application program is further executable by the processor to:
register a number of members of each instantiable software construct of the software code before the software bug fix;
determine a number of members of each instantiable software construct that have changed due to the software bug fix; and
determine the locality value on the basis of the ratio of the determined number of members of each instantiable software construct that have changed and the registered number of members of each instantiable software construct before the software bug fix.

9. A software quality evaluating system, comprising:
a processor;
non-transitory computer-readable media;
computer instructions stored in the non-transitory computer-readable media and executable by the processor to:
track a number of software code components and the respective number of lines of code of each software component of a software code under modification;
calculating a locality value by comparing a number of software code components that have changed due to a modification of the software to a number of software code components that have been added and deleted due to the modification of the software;
calculating a lines of code change ratio by comparing a number of lines of code of each software code component that have changed due to the modification of the software to a total number of lines of code of each software code component before the modification of the software;
determine an invasiveness value based at least on (a) the calculated locality value and (b) the calculated lines of code change ratio, the invasiveness value being indicative of the extent of software code changes upon modification of the software; and
output the invasiveness value for each software modification; and
a display in communication with the processor, wherein the invasiveness value may be output on the display.

10. The software quality evaluating system according to claim 9, wherein the software modification is one of the group of a software bug fix, an implementation of a software feature, a functional software requirement and a non-functional software requirement.

11. The software quality evaluating system according to claim 9, wherein the processor is configured to output a series of invasiveness values for a series of subsequent software modifications.

12. A computer program product being embodied on a non-transitory computer-readable medium, the computer program product comprising instructions executable by a machine or a processor, wherein when said machine or processor executes said instructions, the following steps are performed:
registering a number of software code components and the respective number of lines of code of each software component of a software code before the implementation of the software modification;
implementing the software modification by changing the software code;
determining a number of software code components that have changed due to the implementation of the software modification;
determining a number of software code components that have been added;
determining a number of software code components that have been deleted;
determining a locality value by calculating a ratio of the number of software code components that have been changed to the number of software code components that have been added and deleted;
determining a number of lines of code of each software component that have changed due to the implementation of the software modification; and
determining an invasiveness value based at least on (a) the determined locality value and (b) the determined number of lines of code that have changed, the invasiveness value being indicative of the extent of software code changes upon implementation of the software modification.

13. The computer program product according to claim 12, wherein determining the invasiveness value is performed on the basis of the ratio of the determined number of lines of code that have changed to the registered number of lines of code before the implementation of the software modification.

14. The computer program product according to claim 12, further comprising instructions executable by the machine or processor to:
register a number of methods for each software component before the implementation of the software modification;
determine a number of methods for each software component that have changed due to the implementation of the software modification; and
determine the invasiveness value on the basis of the ratio of the determined number of methods for each software component that have changed and the registered number of methods for each software component before the implementation of the software modification.

15. The computer program product according to claim 12, further comprising instructions executable by the machine or processor to:
register a number of members of each instantiable software construct of the software code before the implementation of the software modification;
determine a number of members of each instantiable software construct that have changed due to the implementation of the software modification; and
determine the invasiveness value on the basis of the ratio of the determined number of members of each instantiable software construct that have changed and the registered number of members of each instantiable software construct before the implementation of the software modification.

16. A computer program product being embodied on a non-transitory computer-readable medium, the computer program product comprising instructions executable by a machine or a processor, wherein when said machine or processor executes the instructions, the following steps are performed:

registering a number of software code components and the respective number of lines of code of each software component of the bugged software code;

fixing the software bug by changing the software code;

determining a number of software code components that have changed due to the software bug fix;

determining a number of software code components that have been added;

determine a number of software code components that have been deleted; and determining a locality value by calculating a ratio of the determined number of software code components that have changed and determined number of software code components that have been added and deleted, the locality value being indicative of the extent of software code changes that have been caused by the software bug fix.

17. The computer program product according to claim 16, further comprising instructions executable by the machine or processor to determine a number of lines of code of each software component that have changed due to the software bug fix; and wherein determining the locality value is performed on the basis of the ratio of the determined number of lines of code that have changed to the registered number of lines of code before software bug fix.

18. The computer program product according to claim 16, further comprising instructions executable by the machine or processor to:

register a number of methods for each software component before the software bug fix;

determine a number of methods for each software component that have changed due to the software bug fix; and determine the locality value on the basis of the ratio of the determined number of methods for each software component that have changed and the registered number of methods for each software component before the software bug fix.

19. The computer program product according to claim 16, further comprising instructions executable by the machine or processor to:

register a number of members of each instantiable software construct of the software code before the software bug fix;

determine a number of members of each instantiable software construct that have changed due to the software bug fix; and determine the locality value on the basis of the ratio of the determined number of members of each instantiable software construct that have changed and the registered number of members of each instantiable software construct before the software bug fix.

\* \* \* \* \*